United States Patent [19]
Lavergne

[11] Patent Number: 6,073,884
[45] Date of Patent: Jun. 13, 2000

[54] ANTICRASH ARMOR-PLATED MODULAR SEAT

[75] Inventor: Jean Michel Lavergne, Marseilles, France

[73] Assignee: Eurocopter, Marignane Cedex, France

[21] Appl. No.: 09/078,284

[22] Filed: May 13, 1998

[30] Foreign Application Priority Data

May 13, 1997 [FR] France .................................. 97 05825

[51] Int. Cl.[7] ................................................ B64D 11/06
[52] U.S. Cl. ..................................... 244/122 R; 89/36.11
[58] Field of Search .......................... 244/122 R, 122 A, 244/121, 122 AG; 297/440.1, 440.14; 89/36.05, 36.04, 36.02, 36.07, 36.11

[56] References Cited

U.S. PATENT DOCUMENTS

| | | |
|---|---|---|
| 1,294,191 | 2/1919 | Suderlock . |
| 3,420,475 | 1/1969 | Castillo et al. .......................... 244/122 |
| 3,581,620 | 6/1971 | Hauck et al. ............................... 89/36 |
| 3,922,034 | 11/1975 | Eggert ..................................... 297/216 |
| 5,164,536 | 11/1992 | Barbaza et al. ......................... 89/36.11 |
| 5,349,893 | 9/1994 | Dunn ....................................... 89/36.05 |
| 5,471,905 | 12/1995 | Martin ..................................... 89/36.02 |

FOREIGN PATENT DOCUMENTS

| | | |
|---|---|---|
| 0 293 786 | 12/1988 | European Pat. Off. . |
| 0 430 773 | 11/1990 | European Pat. Off. . |
| 1 009 977 | 11/1957 | Germany . |
| 1 239 292 | 7/1971 | United Kingdom . |

OTHER PUBLICATIONS

French Preliminary Search Report dated Jan. 13, 1998, French Appl. No. FR 9705825.

*Primary Examiner*—Robert P. Swiatek
*Attorney, Agent, or Firm*—Marshall, O'Toole, Gerstein, Murray & Borun

[57] ABSTRACT

An armor-plated seat, in particular for a helicopter, the seat comprising an armor-plated seat proper and an armor-plated back secured to the seat proper. The seat comprises at least an armor-plated modular element designed to be fastened onto the seat proper and/or onto the back in order to protect a user of the seat.

14 Claims, 2 Drawing Sheets

ANTICRASH ARMOR-PLATED MODULAR SEAT

FIELD OF THE INVENTION

The present invention relates to an armor-plated seat, in particular an armor-plated seat for a helicopter, and in particular an anticrash seat.

BACKGROUND OF THE INVENTION

The armor-plated seats currently found on board helicopters, in particular military or para-military helicopters, are one piece seats which, once installed on board a helicopter, ensure total protection of the passengers of said seats.

However, that total protection is ensured to the detriment of seat weight, comfort, ergonomics, and freedom of movement of the passenger.

In addition, the passenger of that type of seat usually performs the functions of the helicopter pilot, which functions require a certain amount of freedom of movement incompatible with the shapes of armor-plated seats.

In addition, not all the missions carried out by military and paramilitary helicopters require total protection of the pilot during the entire duration of the flight. Partial protection is generally sufficient during the first part of the mission, while total protection becomes imperative only when the helicopter has entered a high risk intervention zone. Known armor-plated seats cannot be adapted to such different flight configurations.

OBJECTS AND SUMMARY OF THE INVENTION

An object of the invention is to resolve the drawbacks mentioned above by proposing an armor-plated seat having a structure which enables the ergonomics and the protection area to be optimized as a function of the different stages of a flight or the different missions of a helicopter on board which it is installed.

To this end, according to the invention, in an armor-plated seat comprising an armor-plated seat proper and an armor-plated back secured to the seat proper, the seat comprises at least one armor-plated modular element designed to be fastened onto the seat proper and/or onto the back in order to protect a user of the seat.

The modularity of the seat of the present invention, while ensuring basic protection by means of an armor-plated seat proper and back, enables the protection of the pilot to be increased depending on the risks incurred during the different stages of intervention.

The armor-plated seat of the invention can optionally further include one or more of the following characteristics:

- at least one modular element is adjustable between a deployed position in which the user is maximally protected, and a retracted position in which said modular element is retracted to enable the user to move freely; a helicopter pilot can thus retract the adjustable protection elements, in particular when boarding the helicopter, or when leaving it;
- the armor-plated seat comprises a plurality of modular elements, comprising at least a hip-protector for protecting the hips of the user, which co-operate by mutual engagement and/or by positive fixing with the seat proper and/or with the back;
- the armor-plated seat comprises a plurality of adjustable modular elements, comprising at least a torso-protector for protecting the torso of the user, which co-operate by mutual engagement and/or by positive fixing with the back;
- the torso-protector comprises a plate and a wing, the plate being fixed to the back and extending laterally relative to the seat, and the wing being slidably mounted on the plate so as to be displaced longitudinally relative to the seat between said deployed and retracted positions;
- the plate includes a flat section which is adjacent to the back and which is terminated by a curved section which curves towards the front of the seat;
- the curved section has longitudinal guide means for longitudinally guiding the wing;
- the longitudinal guide means comprise two brackets respectively placed in the top portion and bottom portion of the curved shape;
- the flat section of the plate includes a cut-out in the bottom portion thereof to enable the user of the seat to access the controls of the helicopter;
- the torso-protector includes locking means for locking the wing in at least each of the deployed and retracted positions;
- the locking means comprise a rod extending between the two brackets, and a comb which is mounted to pivot on the wing between a first position in which it cooperates with the rod and a second position in which it is disengaged from the rod by the user of the seat;
- the torso-protector comprises lateral shock resistant protection means such as an air bag;
- the armor-plated seat comprises an armor-plated head rest of adjustable height, and concaved towards the user of the seat;
- the head rest comprises two armor-plated transparent wings turned towards the front of the seat; and
- the seat proper, the back and the modular elements are made of an armor-plating material comprising a metal and/or synthetic and/or mineral honeycomb structure or such a structure comprising reinforcing fibers and a ceramic.

Thus, the armor-plated seat of the present invention has ergonomic shapes because it uses shaped ceramics. In addition, the seat is capable of withstanding the forces of a crash and is self-supporting, possibly to such an extent as to suffice on its own in the event of a crash. It can also be installed on a suitable anticrash structure.

BRIEF DESCRIPTION OF THE DRAWINGS

An embodiment of the invention is described below with reference to the accompanying drawings, in which.

DETAILED DESCRIPTION OF THE PREFERRED EMBODIMENT

Figure 1:
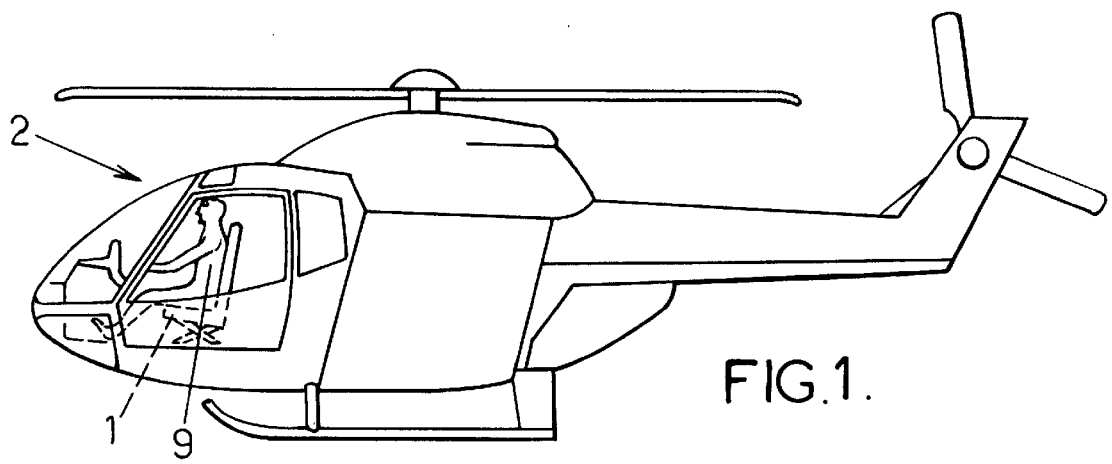
FIG. 1 is an overall view of a helicopter in which an armor-plated seat of the present invention is fitted.
Figure 2:
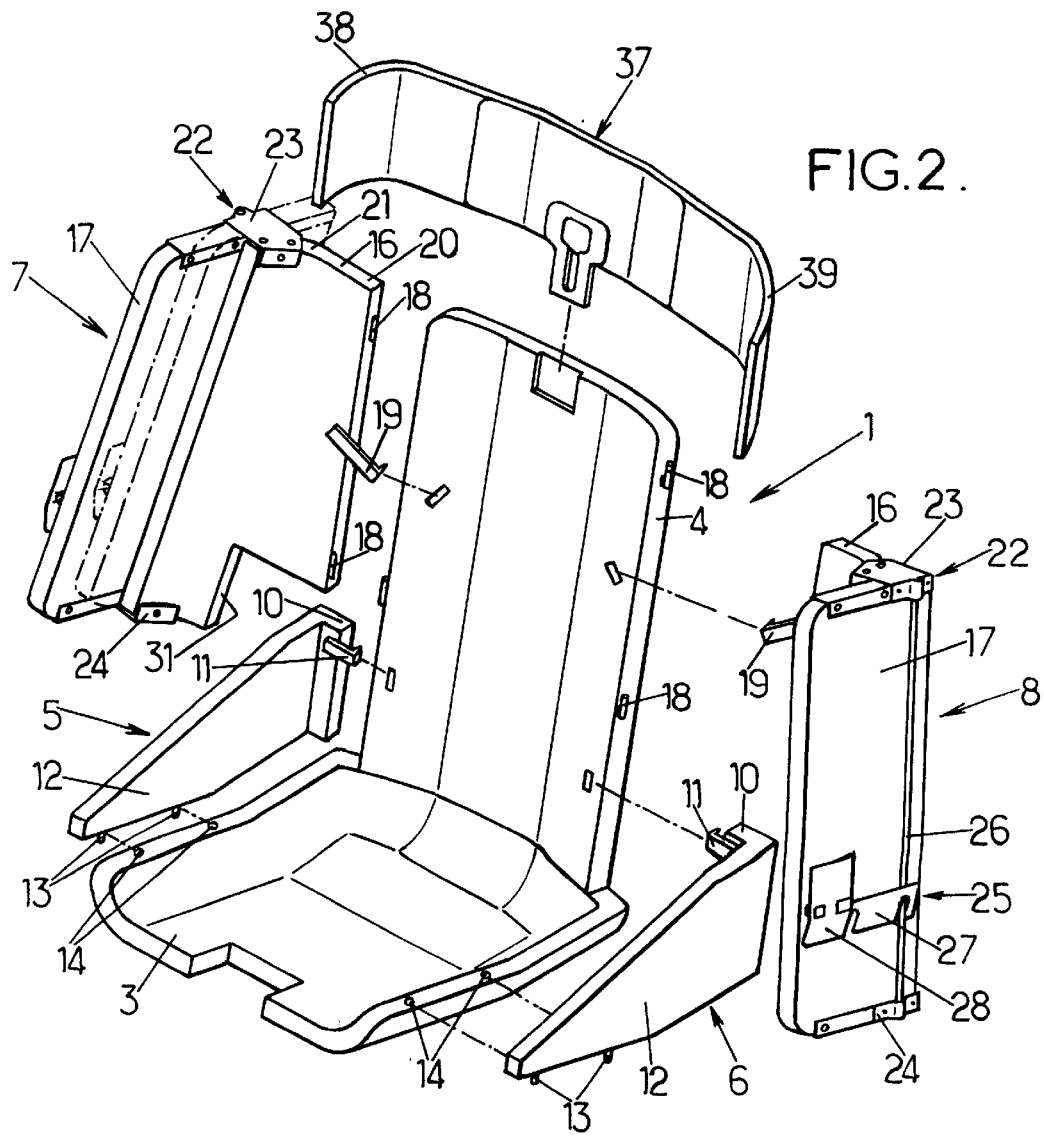
FIG. 2 is an exploded perspective view of the armor-plated seat of the present invention.

The armor-plated seat 1 of the present invention as shown in FIG. 2 and fitted on board the helicopter 2 of FIG. 1 comprises an armor-plated seat proper 3 integral with an armor-plated back 4, together with four modular elements 5 to 8 designed to be fastened onto the seat proper 3 and onto the back 4 in order to protect a user 9 of the seat.

The modular elements comprise firstly two hip-protectors 5 and 6, and secondly two torso-protectors 7 and 8.

The two hip-protectors 5 and 6, which are mirror images of each other, or which are of various shapes adapted to the environment of the helicopter, are each L-shaped, the small side 10 having a locking catch 11 for locking onto the back 4, and the long side 12 having a converging shape which converges towards the front of the seat. In the bottom portion, the long side 12 has two cylindrical positioning pegs 13 designed to be engaged in two holes 14 made in the side of the seat proper 3.

The two hip-protectors 5 and 6 are designed to be fastened and secured onto the seat proper by engaging the pegs 13 in the holes 14, and to be fixed in positive manner to the back 4 by means of catches 11. They are thus removable and their shape is adapted to the ergonomic requirements of piloting, and enables the crew to freely access the flight controls such as a collective stick, or a cyclic stick, or even the pedals of the rudder bar of the helicopter (these known elements not being shown in the figures).

In addition, the two torso-protectors 7 and 8, which are also mirror images of each other, respectively comprise a plate 16 designed to be fixed to the back 4, and extending laterally relative to the seat 1, and a wing 17 slidably mounted on said plate 16 so as to be displaced longitudinally relative to the seat 1 between two extreme positions called the "deployed" position and the "retracted" position.

The plate 16 is designed to be fixed to the back 4 and to be disconnected therefrom by means of two hinge-pins 18 and a catch 19. To prevent the plate 16 from pivoting relative to the back 4, the two pins 18 are not placed on the same axis. The catch 19 is designed to be secured onto the front face of the back 4.

In addition, the plate 16 includes a flat first section 20 designed to be adjacent to the back 4 and which is extended by a curved second section 21 which curves towards the front of the seat 1.

The curved section 21 has longitudinal guide means 22 for longitudinally guiding the wing 17. The longitudinal guide means 22 comprise two brackets 23 and 24 respectively placed at the top and at the bottom of the curved section 21, and enable the wing 17 to be displaced longitudinally between the deployed position in which the passenger of the seat is maximally protected, and a retracted position in which the passenger benefits from reduced side protection of the torso. The two positions, shown in solid lines and in chain-dotted lines in FIG. 2 correspond respectively to the wing 17 projecting towards the front of the seat, and to said wing being retracted rearwardly. It should be understood here that the notion of "torso" covers all or only part of the body of the user lying between the hips and the head. In addition, the components of the armor-plated seat, and in particular the section 21, can be adapted to the morphology of the crew in order to obtain an assembly that is ergonomic.

The wing 17 can be secured in any intermediate position between the deployed and retracted positions by using locking means 25.

The locking means 25 comprise a rod 26 which extends vertically between the two brackets 23 and 24, and externally relative to the seat 1. The rod 26 is designed to cooperate with a comb 27 which is mounted to pivot on the wing 17. The comb 27 is normally urged by resilient means (not shown) to cooperate with the rod 26. The comb 27 further includes a control tab 28 designed to be actuated by the user of the seat to cause the comb 27 to pivot and release the rod 26 to enable the wing 17 to slide relative to the plate 16.

Figure 3:
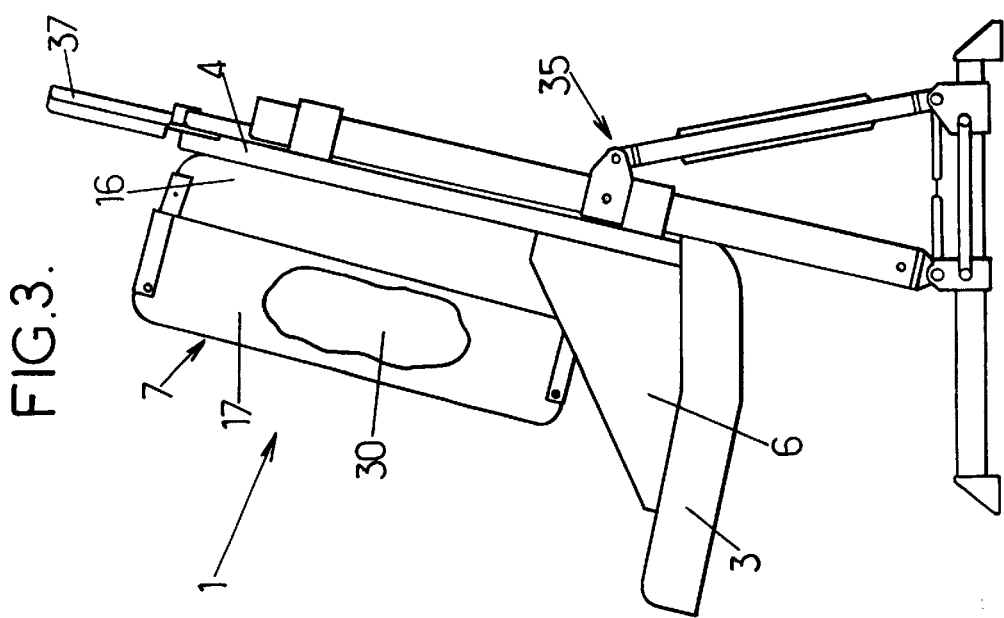
FIG. 3 is a side view of the armor-plated seat of FIG. 2 with its modular elements ensuring total protection of the passenger of the seat.

Furthermore, the wing 17, on its face turned towards the inside of the seat, comprises lateral shock resistant passenger-protecting means designed to protect the passenger in the event of an accident. These means can take the form of an air bag 30, such as that shown in FIG. 3, e.g. that is inflated when crash acceleration is detected. It will be observed that for reasons of clarity, the torso-protector 8 is not shown in this figure.

A cut-out 31 is provided in the bottom portion of the flat section 20, said cut-out being designed to facilitate pilot access to the controls of the helicopter.

Figure 4:
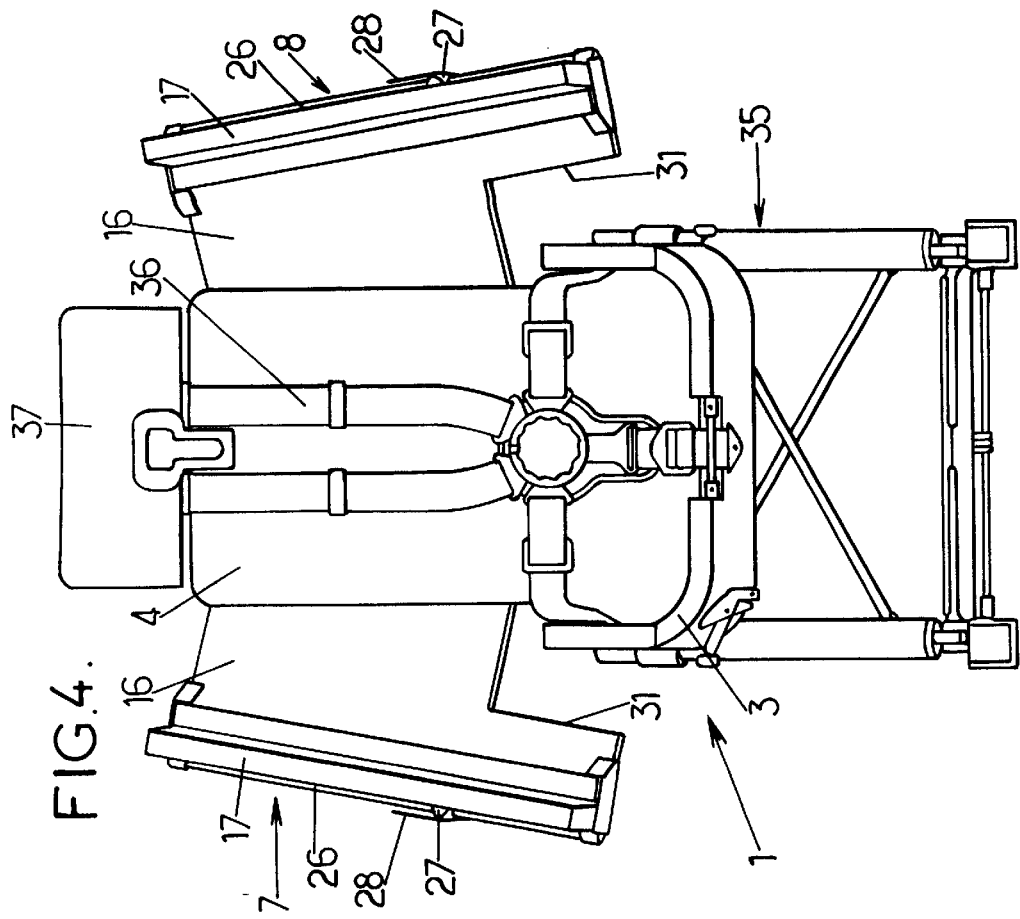
FIG. 4 is a front view of the armor-plated seat of FIG. 3.

In addition, the seat proper 3 and the back 4 have shapes that are geometrically simple, thus enabling conventional seat cushions (not shown) to be used. The assembly is designed to be easily fitted to an anticrash system 35 such as that shown in FIGS. 3 and 4 and currently to be found in the prior art.

The above-described seat structure also enables a seat belt 36 to be fitted, having anchor points situated in positions similar to those currently used on non-armor-plated seats.

The seat proper 3, the back 4, and the modular elements 5 to 8 are made of an armor-plating material comprising a honeycomb structure, which may be made of metal or which may be of the NOMEX® (a registered trademark of E.I. du Nemours and Company for its brand of textile fiber used for the interior furnishings of aircraft) type, comprising reinforcing fibers and a ceramic.

In manner known per se, the seat 1 further comprises, on its back 4, an armor-plated head rest 37 of adjustable height. The head rest 37 is concave in shape towards the inside of the seat and is made out of the same armor-plating material as the elements described above. It further comprises two transparent wings 38 and 39 also made of an armor-plating material, said wings being transparent so as not to obstruct the field of vision of the passenger.

From a basic armor-plated structure constituted by the seat proper 3 and the back 4, it thus appears that the user of the seat has the possibility of modifying user protection (by increasing or decreasing it) both before a helicopter flight and during the flight. In addition, even though both hip-protectors 5, 6 and both torso-protectors 7, 8 are shown as being of identical sizes, they can, in a variant, be of different sizes.

I claim:

1. An armor-plated seat comprising an armor-plated seat proper and back, said seat comprising at least one removable armor-plated modular element designed to be fastened and secured onto at least one of the seat proper and the back as well as or removed from said seat proper and said back in order to ensure at least one of a level of protection for a user of the seat, relative to the different stages of flight of the helicopter, wherein the seat proper, the back and the at least one modular element are made of an armor-plating material comprising a honeycomb structure.

2. An armor-plated seat according to claim 1, wherein said at least one modular element is adjustable between a deployed position in which the user is maximally protected, and a retracted position in which said modular element is retracted to enable the user to move freely.

3. An armor-plated seat according to claim 2, comprising a plurality of modular elements, comprising at least a hip-protector for protecting the hips of the user, which co-operate by at least one of mutual engagement and by positive fixing with at least one the seat proper and with the back.

4. An armor-plated seat according to claim 3, comprising a plurality of adjustable modular elements, comprising at least a torso-protector for protecting the torso of the user, which co-operate by at least one of engagement and by positive fixing with the back.

5. An armor-plated seat according to claim 4, wherein the torso-protector comprises a plate and a wing, the plate being fixed to the back and extending laterally relative to the seat, and the wing being slidably mounted on the plate so as to be displaced longitudinally relative to the seat between said deployed and retracted positions.

6. An armor-plated seat according to claim 5, wherein the plate includes a flat section which is adjacent to the back and which is terminated by a curved section which curves towards the front of the seat.

7. An armor-plated seat according to claim 6, wherein the curved section has longitudinal guide means for longitudinally guiding the wing.

8. An armor-plated seat according to claim 7, wherein the longitudinal guide means comprise two brackets respectively placed in the top portion and bottom portion of the curved section.

9. An armor-plated seat according to claim 8, wherein the flat section of the plate includes a cut-out in the bottom portion thereof to enable the user of the seat to access the controls of the helicopter.

10. An armor-plated seat according to claim 9, wherein the torso-protector includes locking means for locking the wing in at least each of the deployed and retracted positions.

11. An armor-plated seat according to claim 10, wherein the locking means comprise a rod extending between the two brackets, and a comb which is mounted to pivot on the wing between a first position in which it cooperates with the rod and a second position in which it is disengaged from the rod by the user of the seat.

12. An armor-plated seat according to claim 11, wherein the torso-protector comprises lateral shock resistant protection means such as an air bag.

13. An armor-plated seat according to claim 12, comprising an armor-plated head rest of adjustable height, and concaved towards the user of the seat.

14. An armor-plated seat according to claim 13, wherein the head rest comprises two armor-plated transparent wings turned towards the front of the seat.

* * * * *